UNITED STATES PATENT OFFICE.

ISAAC COOPER HATCH, OF SANTA CRUZ, CALIFORNIA.

CEMENT.

SPECIFICATION forming part of Letters Patent No. 385,859, dated July 10, 1888.

Application filed October 4, 1887. Serial No. 251,441. (No specimens.)

*To all whom it may concern:*

Be it known that I, ISAAC COOPER HATCH, of Santa Cruz, in the county of Santa Cruz and State of California, have invented a new and Improved Cement, of which the following is a full, clear, and exact description.

This invention relates to the manufacture of cement, the object of the invention being to provide a cement that shall be extremely tenacious, and one that will quickly and fully indurate.

My cement is made from the following ingredients, combined substantially in the proportions specified: lime, (air-slaked,) fifteen pounds; fine sand, ten pounds; coralline, fifteen pounds; sugar, ten pounds, these ingredients to be finely ground and thoroughly mixed together.

Cement compounded as above described is to be used in the ordinary manner, and will be found to be particularly well adapted for the building of strong heavy walls of either brick or stone.

Having thus fully described my invention, I claim as new and desire to secure by Letters Patent—

The herein-described composition of matter constituting a cement, consisting of lime, sand, coralline, and sugar, combined substantially in the proportions specified.

ISAAC COOPER HATCH.

Witnesses:
E. SPALSBURY,
W. D. STOREY.